(12) United States Patent
Koskovich

(10) Patent No.: US 6,539,830 B1
(45) Date of Patent: Apr. 1, 2003

(54) AUTOMATED BOARD PROCESSING APPARATUS

(75) Inventor: Jerome E. Koskovich, Byron, MN (US)

(73) Assignee: The Koskovich Company, Rochester, MN (US)

( * ) Notice: Subject to any disclaimer, the term of this patent is extended or adjusted under 35 U.S.C. 154(b) by 0 days.

(21) Appl. No.: 09/417,556

(22) Filed: Oct. 13, 1999

(51) Int. Cl.⁷ .............................. B26D 5/00; B26D 7/00; B27B 31/00

(52) U.S. Cl. ................................ 83/13; 83/72; 83/75.5; 83/76.8; 83/367; 83/371; 83/416; 83/422; 83/460; 83/483; 83/477.1; 144/357; 144/285.1; 144/245.2; 144/245.3; 144/250.23; 219/121.69; 219/121.72

(58) Field of Search ............................... 83/13, 35, 36, 83/60–62, 72, 75.5, 76.8, 360, 364, 365, 367, 369, 371, 404, 409, 412, 416, 418, 422, 460, 483, 477.1; 144/356, 357, 245.1, 245.2, 245.3, 245.4, 245.5, 245.6, 250.23; 101/18, 4, 43, 93.1; 700/227; 702/33, 158; 219/121.6, 121.69, 121.72

(56) References Cited

U.S. PATENT DOCUMENTS

| | | | |
|---|---|---|---|
| 2,744,639 A | | 5/1956 | Evans |
| 3,079,963 A | | 3/1963 | Jensen |
| 3,247,963 A | | 4/1966 | Fehely |
| 3,329,181 A | * | 7/1967 | Buss et al. ............... 83/365 X |
| 3,491,809 A | | 1/1970 | Schneider |
| 3,566,936 A | * | 3/1971 | Golick ...................... 144/357 |
| 3,685,129 A | | 8/1972 | Jureit et al. |
| 3,811,353 A | * | 5/1974 | Miles ........................ 83/75.5 |
| 3,910,142 A | * | 10/1975 | Jureit et al. .............. 83/364 X |
| 3,970,128 A | | 7/1976 | Kohlberg |
| 3,983,403 A | * | 9/1976 | Dahistrom et al. ..... 144/357 X |
| 4,023,605 A | * | 5/1977 | Hellstrom et al. .......... 144/356 |
| 4,093,007 A | * | 6/1978 | Hellstrom .................. 144/2.1 |

(List continued on next page.)

OTHER PUBLICATIONS

Koskovich Company Brochure and photos of "Auto–Omni" product.

Virtek Vision Corp., *Virtek Laser MC*. Admitted Prior Art.

Primary Examiner—Boyer D. Ashley
(74) Attorney, Agent, or Firm—Patterson, Thuente, Skaar & Christensen

(57) ABSTRACT

In preferred embodiments the invention includes a transverse board conveyor, a board extrusion portion, a marking station a sawing portion, and one or more board feeding portions, all of which are controlled by a process controller. In such, preferred embodiments, one or more stacks of boards are serially fed onto the transverse board conveyor and are conveyed in a direction transverse to the length of the boards. The boards are individually deposited into an elongate receiver of a board extrusion portion to be conveyed longitudinally. A carriage in the receiver transports the boards past an end detection station, past a marking station, and to a sawing station. The carriage has a moveable clamping member which pinches the board between a wall of the receiver and the clamping member. The carriage moves down the receiver with the board clamped thereto conveying the board in a longitudinal direction to position the board in a desired position for sawing the board. The sawing station is located at a proximal end of the receiver with proximity sensors, such as optical sensors comprising the end detection station also positioned at said end. A clamping station comprising a pair of gripping rollers secure the proximal end of the board adjacent the saw station for sawing. The marking station, also positioned at said end, prints desired indicia at selected positions on the board such as by an ink jet printer without physical contact of the printing mechanism with the board and while the board is moving. A process controller automates the functions.

4 Claims, 10 Drawing Sheets

U.S. PATENT DOCUMENTS

| | | | | |
|---|---|---|---|---|
| 4,120,333 A | * | 10/1978 | Hellgren et al. | 144/242.1 |
| 4,220,115 A | * | 9/1980 | Brossman et al. | 83/371 X |
| 4,281,696 A | * | 8/1981 | Howard et al. | 83/365 X |
| 4,305,538 A | | 12/1981 | Schultz | |
| 4,392,204 A | * | 7/1983 | Prim et al. | 700/227 |
| 4,399,849 A | * | 8/1983 | Nowakowski | 106/31.2 |
| 4,484,675 A | | 11/1984 | Doherty et al. | |
| 4,794,963 A | * | 1/1989 | Oppeneer | 144/358 |
| 4,879,752 A | | 11/1989 | Aune et al. | |
| 4,926,917 A | * | 5/1990 | Kirbach | 144/356 |
| 4,936,437 A | | 6/1990 | Gearhart | |
| 4,977,805 A | * | 12/1990 | Corley, III | 83/76.8 |
| 5,208,962 A | | 5/1993 | Walker, Jr. | |
| 5,335,790 A | * | 8/1994 | Geiger et al. | 144/340 |
| 5,381,712 A | | 1/1995 | Head, Jr. et al. | |
| 5,417,265 A | | 5/1995 | Davenport et al. | |
| 5,605,216 A | | 2/1997 | Raybon et al. | |
| 5,685,410 A | | 11/1997 | Ritola et al. | |
| 5,992,484 A | | 11/1999 | Jackson | |
| 6,089,135 A | * | 7/2000 | Murray | 83/365 X |

\* cited by examiner

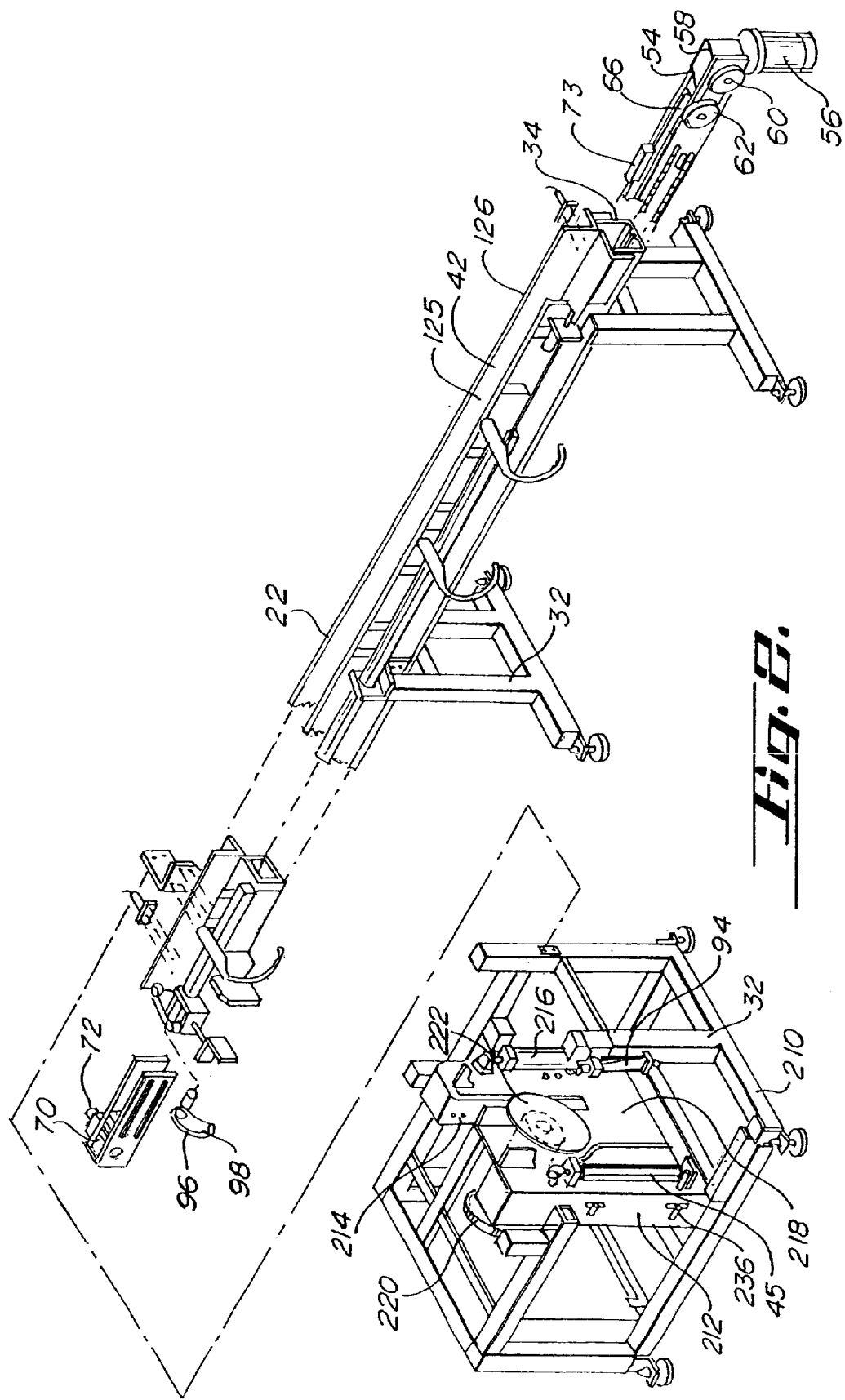

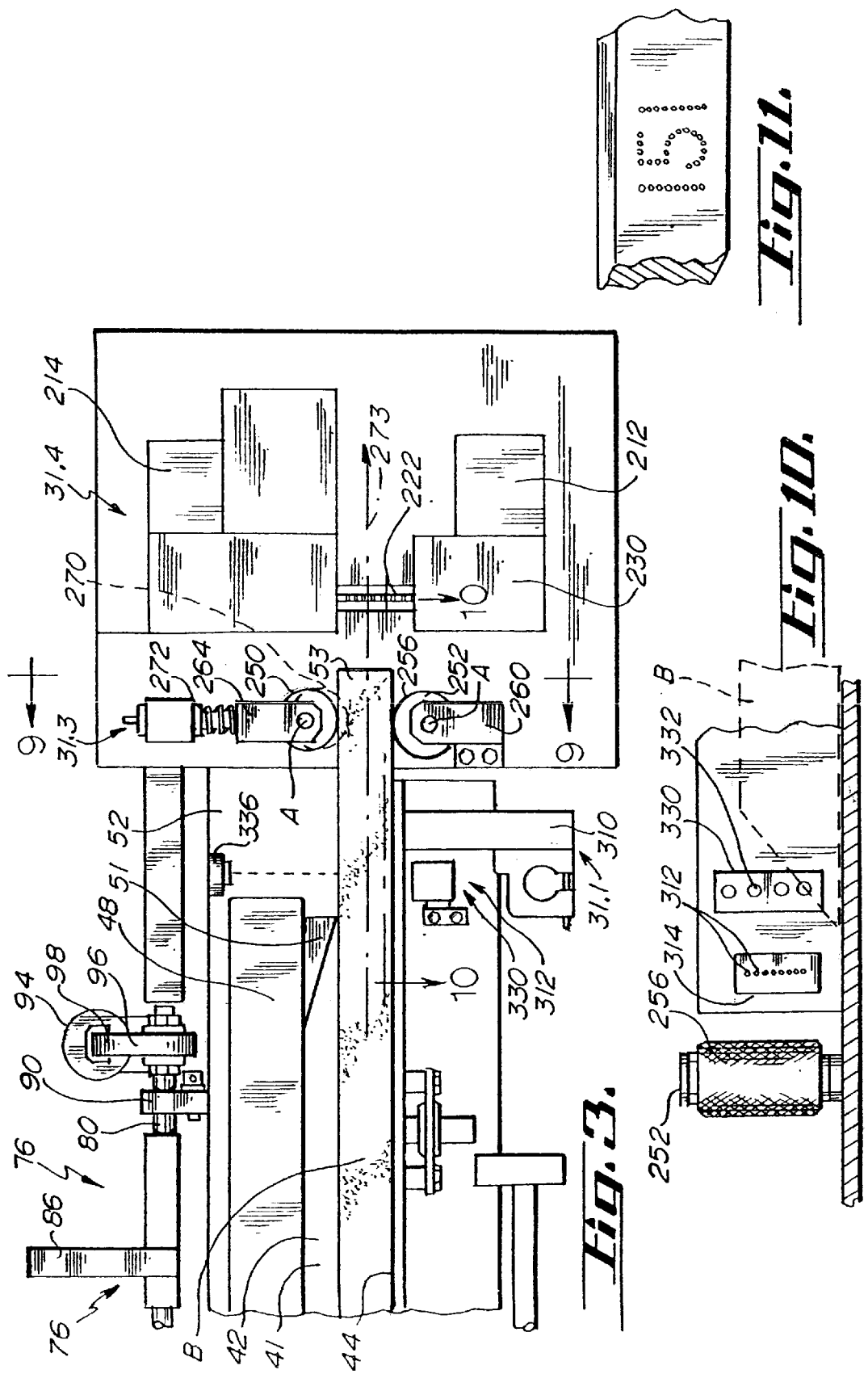

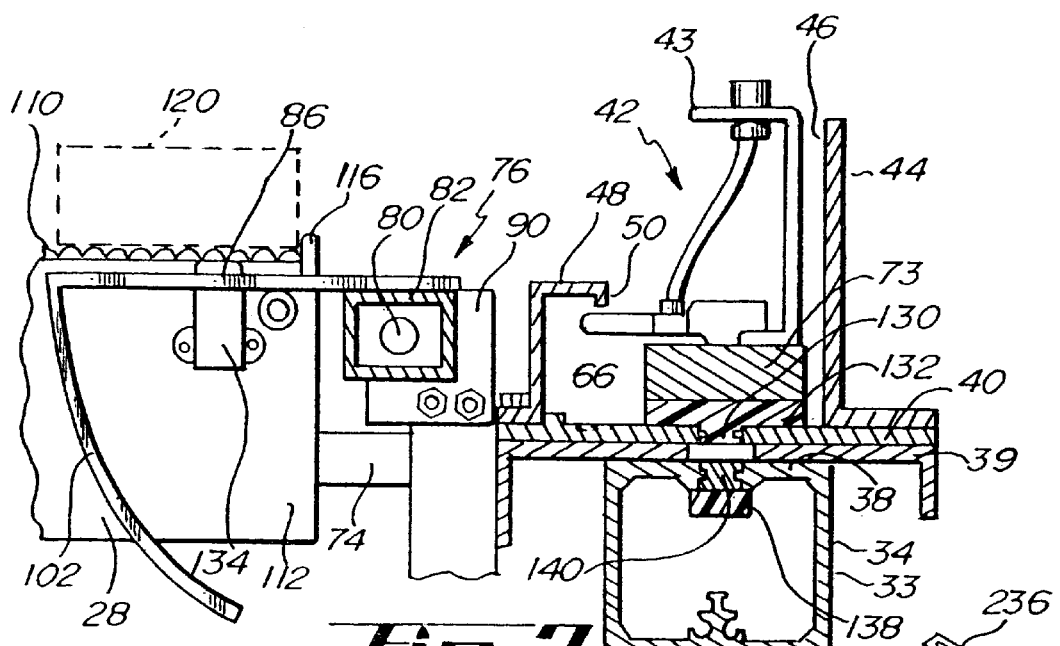
Fig. 7.
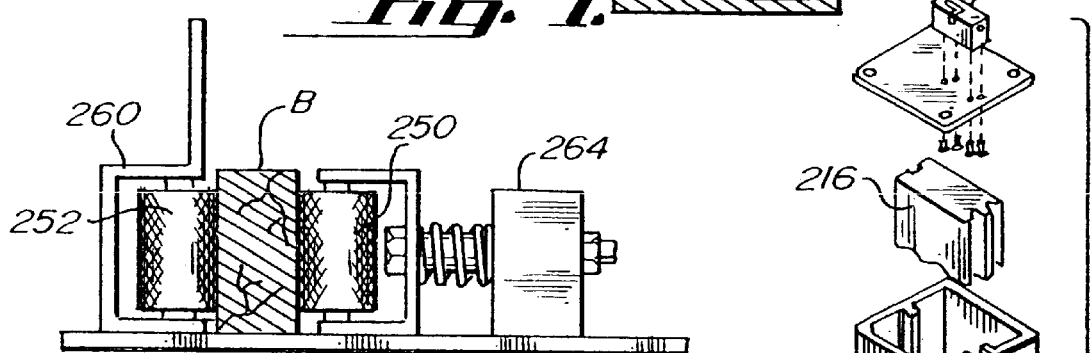
Fig. 9.
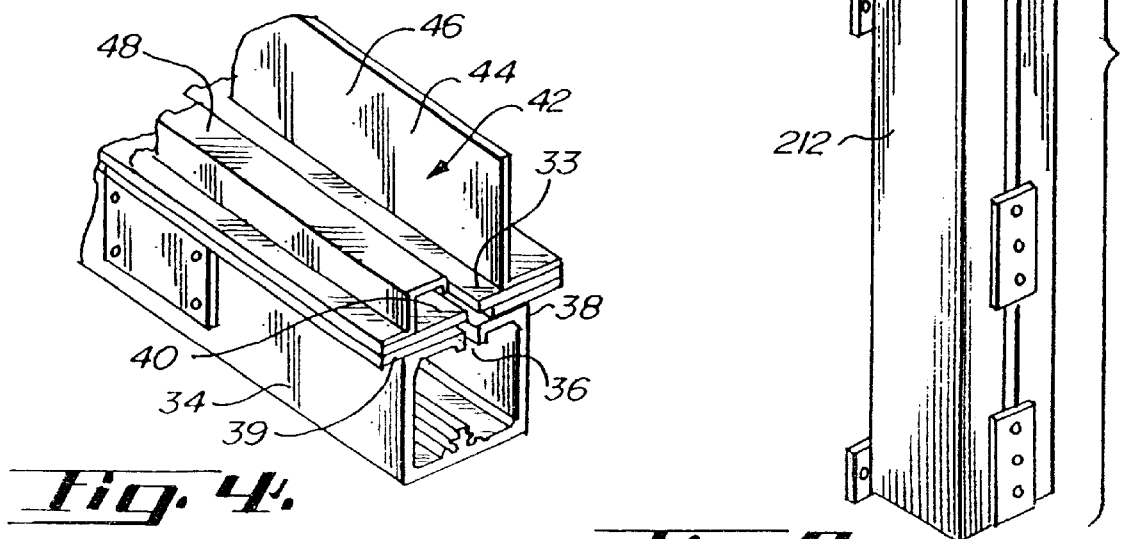
Fig. 4.
Fig. 8.

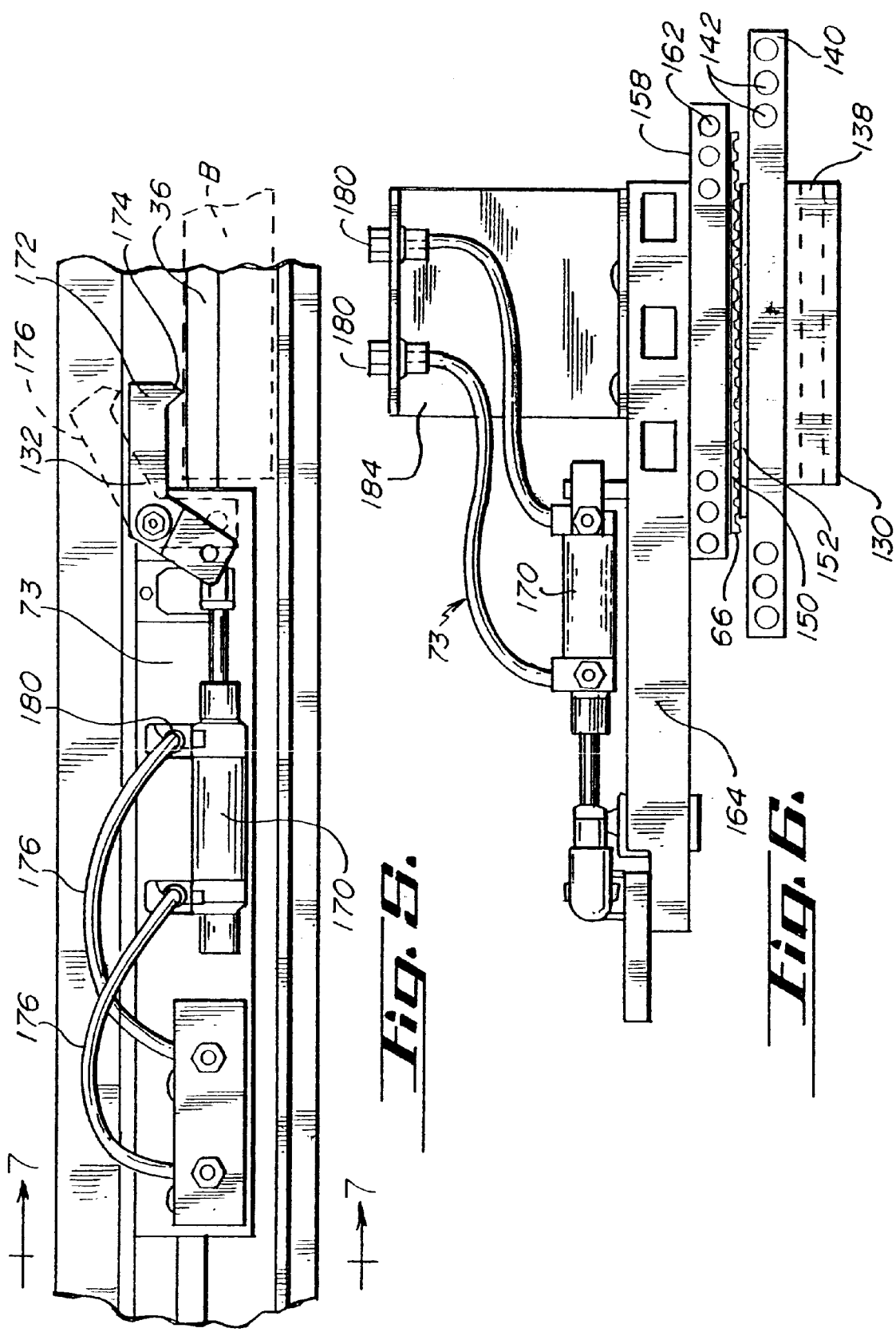

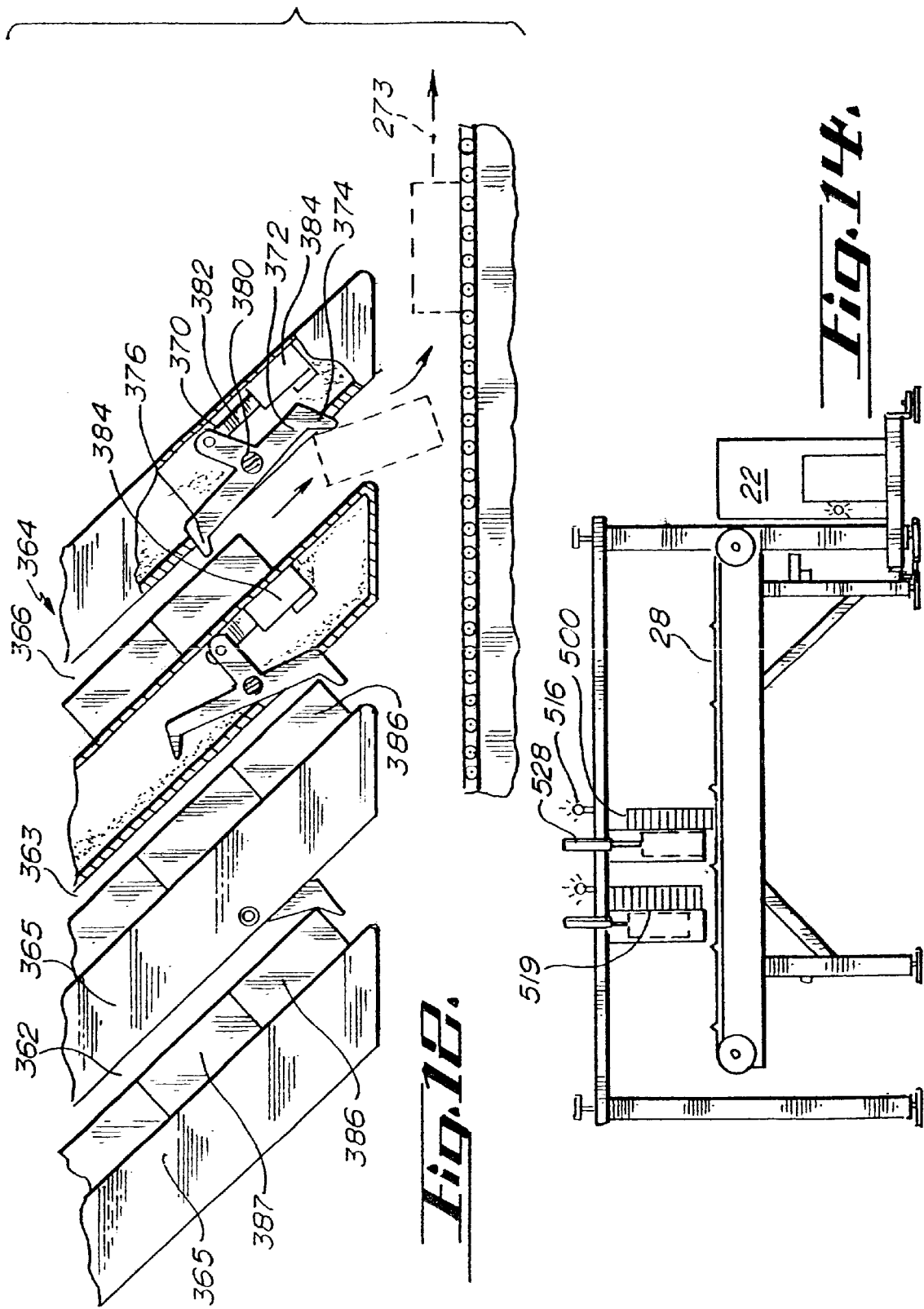

AUTOMATED BOARD PROCESSING APPARATUS

BACKGROUND OF THE INVENTION

This invention relates to lumber processing equipment, more particularly the invention relates to equipment for the automated measuring and further processing of the lumber including sawing and marking.

With rising labor costs and demands for more time and cost efficient construction, it has become desirable to construct building components and modules off-site at specialized fabrication facilities. In manufacturing wood frame walls, especially for prefabricated residential structures, there are great economies in providing automated equipment that can measure, cut, and mark the components utilized in wall frames. Where a particular wall design is repeated over and over, such automated equipment can decrease time of construction and lower costs. The economics are even greater for custom wall designs. For wood structures where the frames are constructed on site, precutting and marking of boards off-site can create a "kit" design minimizing necessary on site sawing and specialized labor.

Known board processing equipment that has any level of automation is mechanically complex and has limitations in capabilities. Moreover, such known equipment for marking and sawing boards requires stopping the board for each marking. Moreover, such equipment has a limited number of marking options. See, for example, U.S. Pat. No. 3,685,129 to Jureit, et. al. Said patent is hereby incorporated by reference. Moreover, known board processing equipment has not combined efficient board feeding aspects to the measuring, sawing, and printing functions.

"Board" when used herein refers to elongate pieces of lumber without restriction to size including length. For example, various lengths of 1×1's, 2×2's, 2×4's, 2×10's, etc., all are included in boards. Any lumber pieces which could be used for studs, plates, headers, and trusses are included as boards. Similarly, lengths of linear veneer laminate, oriented strand board, finger joint board, are included in the definition of the boards.

SUMMARY OF THE INVENTION

An automated board processing system process expediently handles a series of boards to measure, mark and/or saw same with optimal mechanical simplicity and efficiency.

In preferred embodiments the invention includes a transverse board conveyor, a board extrusion portion, a marking station, a sawing portion, and one or more board feeding portions, all of which are controlled by a process controller. In such, preferred embodiments, one or more stacks of boards are serially fed onto the transverse board conveyor and are conveyed in a direction transverse to the length of the boards. The boards are individually deposited into an elongate receiver of a board extrusion portion to be conveyed longitudinally. A carriage in the receiver transports the boards past an end detection station, past a marking station, and to a sawing station. The carriage has a gripping portion comprising a moveable-clamping member which in one embodiment pinches the distal end of the board (with respect to the saw station) between a wall of the receiver and the clamping member. The carriage moves down the receiver with the board clamped thereto conveying the board in a longitudinal direction to position the board in a desired position for sawing the board. The sawing station is located at a proximal end (with respect to the saw station) of the receiver with proximity sensors, such as optical sensors comprising the, end detection station also positioned at said end. A clamping station comprising a pair of gripping rollers secure the proximal end of the board adjacent the saw station for sawing. The marking station, also positioned at said end, prints desired indicia at selected positions on the board such as by an ink jet printer without physical contact of the printing mechanism with the board and while the board is moving.

Automation is provided by a process controller, such as a personal computer. The board feeding portion, the board-conveying portion, the extruding portion, the sawing portion, and the marking portion are all controlled by the process controller. The process controller handles the necessary computation for determining saw locations, printing locations, printing data, and operation of the various equipment portions. Data regarding sawing locations on boards, board-printing locations, printing indicia are all input into, calculated by, downloaded into and/or stored by the process controller. Such data may be input manually at the counsel.

As the board is conveyed down the receiver, under control of the process controller the optical sensors convey to the process controller the point at which the proximal end passes the optical sensors. An encoder or other position indicating sensor connected to the carriage drive provides the location of the carriage as the optical sensors are triggered at the end of each particular board. The process controller can then calculate the length of the board and board locations for printing or sawing. Pairs or multiple optical sensors can similarly identify the angle of the preexisting cut on the end of the board as well as the dimensions of the board. The process controller determines and controls the timing and actuation of the movement of the carriage, the gripping function, the marking station and sawing portion as the board is advanced.

A feature and advantage of particular embodiments of the invention is that the clamping, conveying, marking and sawing is accomplished with a mechanically simple configuration with a minimal number of moving parts and a minimal number of actuators and powered components. For example, the clamping of the carriage at the distal end of the board and the clamping of the distal end of the board to the receiver may be accomplished by a single actuator operating a pivoting clamping member.

Thus an advantage and feature of particular embodiments of the invention is that the gripping portion including the clamping mechanism for the distal end of the board to be sawed is mechanically simple while still reliably securing the board.

A further feature and advantage of particular embodiments of the invention is the clamping station has minimal moving parts with a first roller freely rotatable and fixed in position and a second roller freely rotatably and laterally moveable and biased toward the first roller to clamp the board to be sawn therebetween. One or both of said rollers can be tilted slightly in the direction of the board travel to assure the board is properly seated at the saw station.

A further feature and advantage of particular embodiments the invention is that the board at the sawing station is reliably and securely held down and clamped without active or powered mechanisms.

A further feature and advantage of preferred embodiments of the invention is that the board is actively clamped only at the moveable carriage. Moreover, the clamping mechanisms do not need to extend above the board being processed, rather they only engage the sides of the board. This keeps the mechanism very simple and does not require any adaptation of the clamping mechanisms for different sizes of the boards. Moreover, in preferred embodiments, the delay in gripping the distal end of the board until after the proximal end has passed the end detection station assures the distal end is properly against the carriage. Moreover, the gripped distal end of the board provides optimal control over the movement of the board in both forward and backward directions.

An advantage and feature of particular embodiments of the invention is that the overall system has an optimally small footprint to minimize the floor space needed for the system.

A further advantage and feature of particular embodiments of the invention is that the length of boards may be determined or verified before the board is cut or marked.

A further advantage and feature of particular embodiments of the invention is that marking of lumber for future operations is accomplished reliably and accurately without stopping, slowing, or otherwise interfering with the travel of the board.

Moreover, the gripped distal end provides optimal control over the movement of the board in both forward and a backward directions.

A further advantage and feature of particular embodiments of the invention is that board markings can be infinitely varied in size, positioning and in the particular indicia utilized.

A further advantage and feature of particular embodiments of the invention is that there is no direct contact between the marking mechanism and the board and thus no interference with the travel of the board and no wear or other stress on the marking mechanism.

A further advantage and feature of particular embodiments of the invention is that marking and sawing of the boards is accomplished in essentially the same operation minimizing the time and equipment needed for these operations if performed on distinct pieces of equipment.

BRIEF DESCRIPTION OF THE DRAWINGS

FIG. 2 is a partially exploded perspective view of the board extrusion portion and sawing portion of the invention.

FIG. 3 is a plan view of the sawing portion and the adjacent end of the extrusion portion of the invention.

FIG. 4 is a perspective view of the end of a receiver and carriage track of the board extrusion portion.

FIG. 5 is a plan view of the carriage and gripper in the receiver and track of the board extrusion portion.

FIG. 6 is a side elevational view of the carriage as shown in FIG. 5.

FIG. 7 is a cross-sectional view taken at line 7—7 of FIG. 5.

FIG. 8 is a perspective view of an upright rail of the sawing portion of the invention.

FIG. 9 is a cross-sectional view taken at line 9—9 of FIG. 3 without the board of FIG. 3.

FIG. 10 is a cross-sectional view taken at line 10—10 of FIG. 3 without the board.

FIG. 11 shows a board with an exemplary ink jet indicia thereon.

FIG. 12 shows an elevational view with sections broken away of the board-feeding portion of the invention.

FIG. 14 is a side elevational view of a processing system utilizing a multiple magazine feeder such as shown in FIG. 13.

DETAILED SPECIFICATION OF PREFERRED EMBODIMENTS

Figure 1:
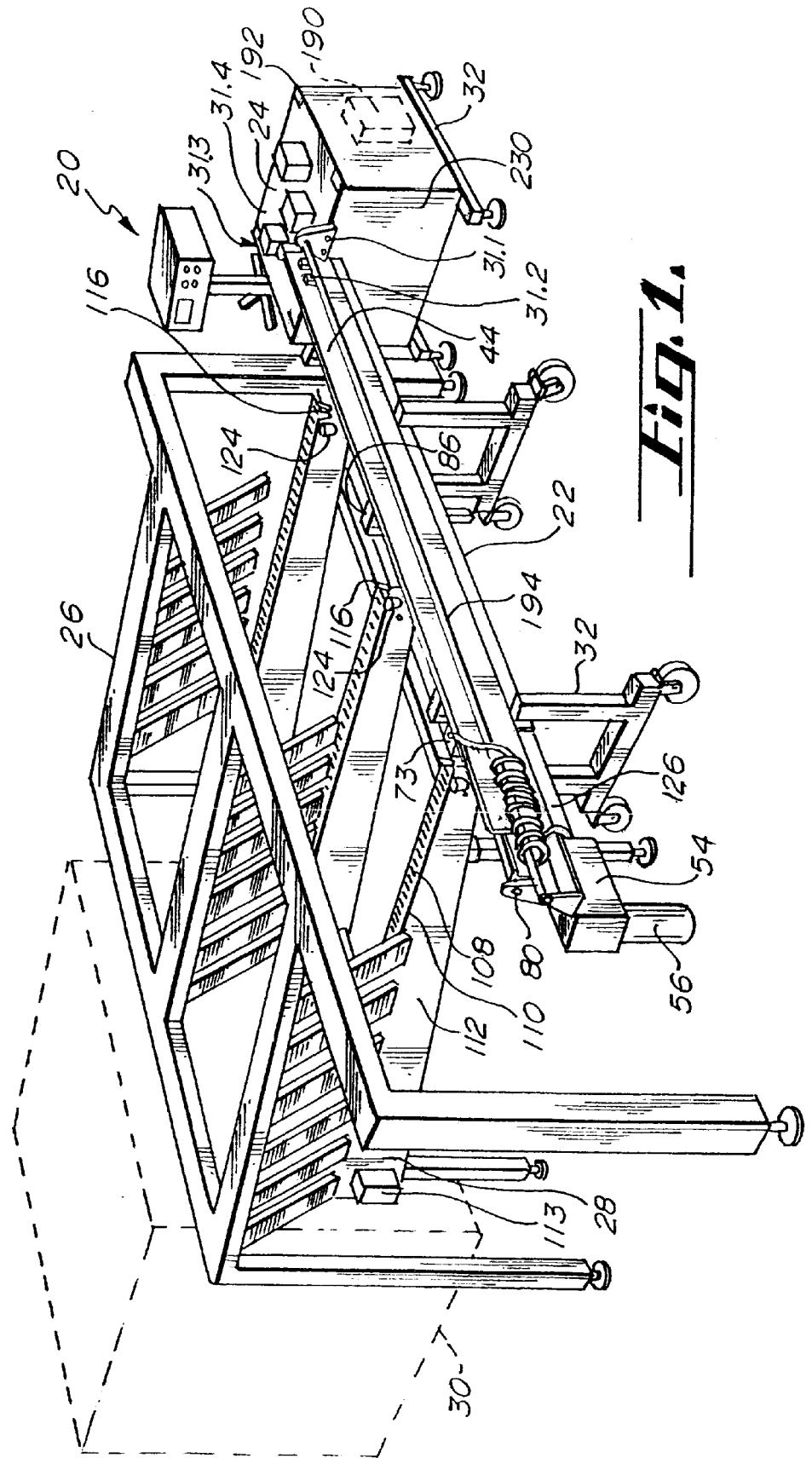
FIG. 1 is a perspective view of the automated sawing and marking system components.

Referring to FIG. 1 a preferred embodiment of an automated processing system suitable for measuring, sawing, and marking is illustrated and is generally designated with the numeral 20. The preferred embodiment of the invention is principally comprised of a board extrusion portion 22, a sawing portion 24, a board feeding portion 26, a transverse board conveyor 28 and a process controller 29. The dashed lines of FIG. 1 also illustrate that an additional board feeding means such as bunk feeders may also be utilized to feed boards onto the transverse board conveyor in conjunction with or as an alternative to the other board feeding portion 26. Said board feeding portion 26 is shown configured as a multiple magazine board feeder.

The various portions individually and collectively have support structure 32 preferably formed of steel tubing. In the embodiment illustrated the individual portions support structures are suitably coupled together to form the overall support structure.

Referring to FIGS. 1 and 3, positioned on the extrusion portion 22 or the sawing portion 24 are marking station 31.1, a board clamping station 31.3, and a sawing station 31.4.

Referring to FIGS. 2, 3, 4, and 7, the board extrusion portion 22 is a longitudinal conveyor with a track 33 which includes a rail 34, spacer pieces 39, and floor pieces 40 generally configured as a square section of tubing with an open slit 36 at its top side 38. The spacer section 39 may be flat bar stock bar as shown in FIG. 4 or angled pieces as shown in FIG. 7. The floor pieces are shown as bar shaped. The assembled pieces form the track with a belt recess 41 extending lengthwise therethrough.

Above the track is positioned a receiver 42 defined by a first upright vertical wall 44 at a first side 46 and an opposing retention member 48 at the second side 50 and the bottom wall 43. A ramped guide portion 51 is at a proximal end 52 (with respect to the sawing station) of the board extruding portion to position and guide the proximal end 53 of the board B being processed with respect to, the clamping station 31.3, the marking station 31.1 and the sawing station 31.4. A drive assembly 54 includes an electric motor 56, suitable right reduction angle gearing 58 connecting to a drive pulley 60, a driven pulley 62 which is attached to the main belt drive pulley, not shown, connected to the drive pulley 62. A main belt 66 extends from the main belt drive pulley to the idler pulley 70 at the opposite end of the rail or track 34. The idler pulley 70 is attached to an encoder 72 for providing position data relative to the belt 66 and an attached carriage 73 which is discussed in more detail below.

Referring specifically to FIGS. 1, 2, 4, and 7, the board-extruding portion is attached to the transverse board conveyor 28 by suitable connecting members 74 as part of the support structure 32. Transfer of the boards from the transverse board conveyor to the receiver 42 of the extrusion portion is accomplished by a suitable transfer means 76 which is shown configured as a shaft 80 extending substantially the length of the receiver with square tubing 82 extending along said shaft and fixed thereto and with a plurality of flip arms 86 attached to the square tubing. The shaft suitably rides upon ultra high molecular weight polyethylene bearings 90 suitably attached to the support structure 32. A pneumatic cylinder 94 anchored to the support structure 32 is attached to a bell crank 96 fixed to the shaft 80. Actuation of the pneumatic cylinder which is attached to the distal end 98 of bell crank 96 rotates the bell crank and the shaft 80 with the square tubing approximately 90°. With said rotation the flip arms 86 rotate from the horizontal position as shown in FIGS. 1 and 2 to an upright position transferring any boards in the transfer position 120 thereon from the transverse board conveyor 28 into the receiver 42 of the board extrusion portion 22. The flip arms may also include additional curved stop members 102 which function to prevent any boards from being conveyed into the unload position on the transverse conveyor before the flip arms return to their horizontal position.

Referring to FIGS. 1, 2, and 7, the transverse board conveyor 28, also termed a "live deck" comprises a generally horizontal conveyance means 108 configured as a plurality of linked roller chain link loops 110 suitably driven by a plurality of sprockets (not shown) positioned in the chain housings 112 and a drive motor 113. Upright stops 116 attached to the support structure 32 and positioned on the ends of the chain housings defining a transfer position 120 as indicated by the dashed lines of FIG. 7. An proximity sensor 124 such as optical, capacitive, mechanical sensor or other sensing means is placed adjacent to the transfer position to detect the presence of a board in the transfer position. Such sensing means may be located at several positions on the support structure adjacent the transfer position to provide information to the process controller as to the length of the board in said position in addition to the presence of such board.

Prior to transfer of the board from the board transfer position, to the distal end 125 of the receiver and distal end 126 of the board extruding portion, the carriage 73 is conveyed longitudinally down the receiver to be out of the way of the board prior to transfer. Referring to FIGS. 5, 6, and 7, details of the carriage are illustrated. The carriage principally comprises a guide portion 130 to secure the carriage in the track and a gripping or clamping portion 132 to clamp a board being processed. The carriage functions to transfer the board being processed longitudinally along the receiver to move the board past the printing station and to appropriately position particular selected points on the board at the sawing station. The guide portion 130 is suitably formed from appropriately stacked metal components and ultra high-density polyethylene. The polyethylene is suitably used for low friction bearing members. The configuration as illustrated includes a lower polyethylene bearing member 138, an adjacent guide member 140 formed of aluminum with a plurality of polyethylene inserts 142 for contact with the rail 34, a pair of opposing spacers 150, 152, which clamp onto the belt 66, another aluminum spacer member 158 with additional polyethylene bearing inserts 162 extends up to the carriage base 164 onto the base is mounted a pneumatic cylinder 170 connecting to a clamping member 172 configured as a finger with an engagement portion 174. Actuation of the pneumatic cylinder 170 rotates the clamping finger from the open position 176 as shown by the dashed lines of FIG. 5 to the engagement position as shown by the solid lines. Significantly, when in the open position, the clamping finger is under the retention member 48.

The pneumatic cylinder 170 is connected by hoses 178 to connectors 180 on a mounting plate 184. The connectors are suitably connected to a pneumatic source 190 remotely located from the carriage such as in the sawing portion 24 as shown in FIG. 1 or with the control processor or separated totally from the equipment. The pneumatic hoses may be suitably suspended from above the extrusion portion to provide for the travel of the carriage or may alternatively be coiled upon a guide shaft 194 as shown in FIG. 1 to facilitate the travel of said carriage in the receiver.

Referring to FIGS. 1, 2, and 8, details of the sawing portion of the invention are shown. The saw station includes a structural frame work 210 generally comprised of steel tubing, a pair of upright guide rails 212, 214, and a pair of glide blocks. Attached to the support plate 218 is a saw motor 220 with the attached saw blade 222. The support plate 218 and attached saw motor and saw blade are movable vertically by attachment to the glide blocks 216 slidably engaged in the rails 212, 214. Fluid powered, pneumatic, or hydraulic cylinders 215, 217 or other actuators controlled by the control processor operate to raise and lower the saw. Suitable shielding 230 is provided to the saw station for protection of operators and other personnel. Appropriate limit switches and sensors 236 are suitably attached to the sawing station for providing data to the process controller relative to the monitoring and control of said sawing station. Although the saw station is shown configured as a chop saw for providing 90° cuts relative to the lengths of the boards, the saw could be adjustable, as is known in the art, with respect to the angles of cuts. Such adjustability could be controlled by the process controller and such would be particularly useful for cutting roof trusses components, for example.

Referring to FIGS. 3, 9, and 10, various aspects of the extruding portion and sawing portion that cooperate are illustrated. Mounted to the support structure of the invention, such as the sawing portion structural framework 210, and forming the clamping station, are a pair of gripping roller clamps 250, 252. Said roller clamps have a textured surface 256 which may be a knurled or other machined surface which provides a high friction engagement with boards. One roller assembly 260 is suitably fixed to put the surface 256 of said roller in substantially coplanar alignment with the vertical wall 44 of the extrusion portion. The other roller assembly 264 is moveable inwardly to an interference positioned 270 as indicated by the dashed.lines. Said roller is biased by a spring 272 or other suitable means inwardly. Thus, when a board is conveyed into engagement with the roller clamps the high friction engagement between the board and rollers allow only a longitudinal movement of the board with respect to the receiver. The axis A of one or both rollers may be slightly inclined toward the sawing station such as to urge the board engaged with said rollers downwardly to maintain board contact with the floor of the sawing station. Slightly less effectiveness can be had using the inwardly biased roller assembly against the vertical wall. The use of such rollers in conjunction with the clamping member 172 provide a minimal number of clamping components and a minimal number of powered clamping components while still efficiently and securely providing a longitudinal controlled and vertically restricted movement of the board past the printing station and to the sawing station. The dashed lines in FIG. 3 enumerated 273 represents the path of travel of the boards.

One of the rollers can be connected to an encoder or the like to provide an alternative or additional registration means for the positioning of the board being conveyed. Moreover, such rollers can be powered to provide alternate conveyance means for the boards other than the carriage. This could be particularly applicable where extremely long boards utilized in association with particular aspects of the invention, i.e., the marking station without the carriage.

Also located adjacent to the sawing station is the marking station 31.1. The marking station projects an indicia forming media onto the surface of the board. An indicia generator is configured as an ink jet printer 310 suitably attached to the support structure. In the configuration as shown the ink jets 312 are positioned at a window 314 in the vertical wall 44. A suitable ink jet printer is-found-to be the Mathews JET A MARK Marks 2002 printer which has multiple linearly aligned ink jets.

The aligned ink jets are positioned transverse to the length of the board. The individual jets intermittently discharge ink as the board is passing by to create a two-dimensional image on the board. This provides a high level of flexibility with respect to the length of the image on the board while utilizing minimal space and components for the print apparatus. Moreover, the printing is controlled by the control processor to be coordinated with the movement of the boards and thus does not control or restrict the flow of lumber through the system as is the case with conventional systems.

The print head may be controlled by a print controller card which is part of the process controller. The print controller is suitably located in the sawing portion or other suitable location. The ink jet printer does not need to be positioned in a window in the vertical wall, and as such, can be on the opposite side of the board. Similarly, more than one ink jet print head can be utilized on one side of the receiver for more definition in the indicia, several ink jet print heads can be used on opposite sides of the receiver or above the receiver. FIG. 11 represents a sample indicia which can provide the location position for a stud indicated by the S. In addition to stud locations, other indicia such as part number or description of the particular piece of lumber to be cut can also be provided by the marking station. The ink jet printers can provide indicia that provides a cut line for an angled cut if the saw portion is not configured to provide such. An alternate indicia generator could be a laser to score the board surface. Either such print head may be mounted to pivot as the board travels by to momentarily follow the board such that the indicia forming media can be adequately disposed on the board surface.

Also illustrated in FIGS. 3 and 10, is a first board end sensing station 31.2 comprised of at least one presence sensing sensor 332 and ideally a plurality of such sensors. In a preferred embodiment, such presence sensing sensors will be optical sensors ideally utilizing a light beam(s) from the light beam generator(s) 336 positioned opposite the receiver from the sensors thus producing a horizontal sensing region. Alternatively, the optical sensors can be of the type with the light generating means adjacent to the light sensor. Other presence sensing sensors could include inductive sensors, capacitive sensors, and mechanical sensors such as micro switches. Such sensors are connected to the control processor and are utilized to detect when the first end or proximal end of the board passes by the sensors. Utilization of the vertically aligned plurality of sensors allows for sequential activation of the sensors for detecting angled cuts on the proximal board end based upon the timing of the sequential activations and the distanced traveled by the carriage and the board as provided by the encoder. Moreover, the actual height of the board can be determined to an accuracy dependent upon the vertical spacing of the sensors. Similarly, sensors facing upward or downward and having a vertical sensing region and spaced transverse to the path-of-travel can be utilized to detect angled cuts as seen from the plan view.

In an embodiment incorporating certain aspects of the invention without the carriage engaging the distal ends of the boards, additional presence sensing sensors, i.e. optos can be utilized along the receiver to form a second board end sensing station. Thus, the control processor can determine the length of a board being conveyed down the receiver by registering the activations of the first and second board end sensors as well as calculating the travel of the board.

Referring to FIGS. 1 and 12, a board-feeding portion 26 of the invention configured as a magazine feeder is illustrated. Details of the mechanism are illustrated in FIG. 12. This board-feeding portion has a plurality of magazines 362, 363, 364 which may be manually or automatically loaded. Such magazines may be utilized for different sizes, grades, lengths or kinds of lumber. As illustrated one magazine may be utilized for 2×6's and another magazine may be utilized for 2×4's or one magazine may hold 8-foot board lengths while another magazine holds 12-foot lengths. The stacks of wood are constrained by pairs of guide portions 365 defining slots 366. The board feeding portion deposits in a serial manner on the live deck boards from selected magazines. The boards in each magazine are retained therein by a powered dual retention mechanism 370. Said mechanism utilizes a lever arm 372 with first and second engagement portions 374, 376 on opposite sides of a pivot point 380. The lever arm is shifted between a first position as shown in the second magazine 363 by the actuation and extension of the powered member 382 which is part of a pneumatic cylinder 384 to a second position as illustrated in the third magazine 364. In the first position the first engagement portion is in an obstructing position with the lower most board 386 and the second engagement portion is in a release or non-clamping position. In the second position the first engagement portion is pivoted out of the obstructing position to release the lowermost board and the second engagement portion is pivoted into a clamping position with the adjacent board 387 next in position in the magazine. After the board in the first magazine position is deposited onto the transverse board conveyor 28 the pneumatic actuation is reversed and the clamping portion is removed from the next board, the first engagement portion is moved to the interference position and the adjacent board and stack falls to engage and stop at the first engagement portion thereby stopping the further discharge of boards from that particular magazine. Actuation o pneumatic cylinder for each magazine is controlled by the process controller. The dashed lines illustrate the path of travel.

Figure 15:
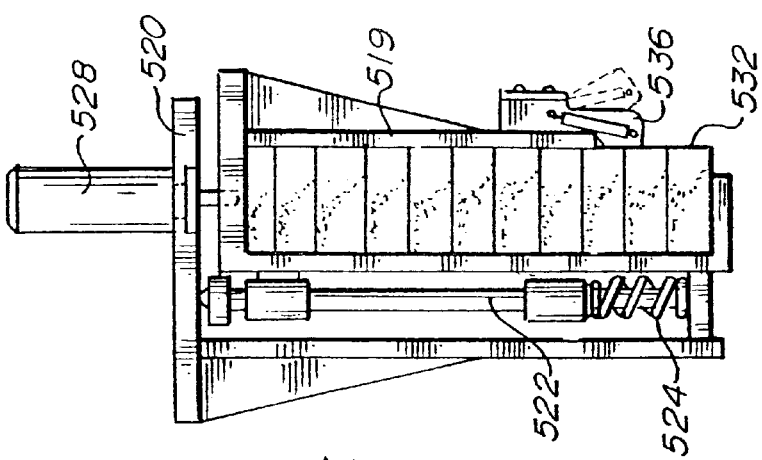
FIG. 15 is a side elevational view of a single rack of a magazine feeder such as shown in FIGS. 13 and 14.
Figure 13:
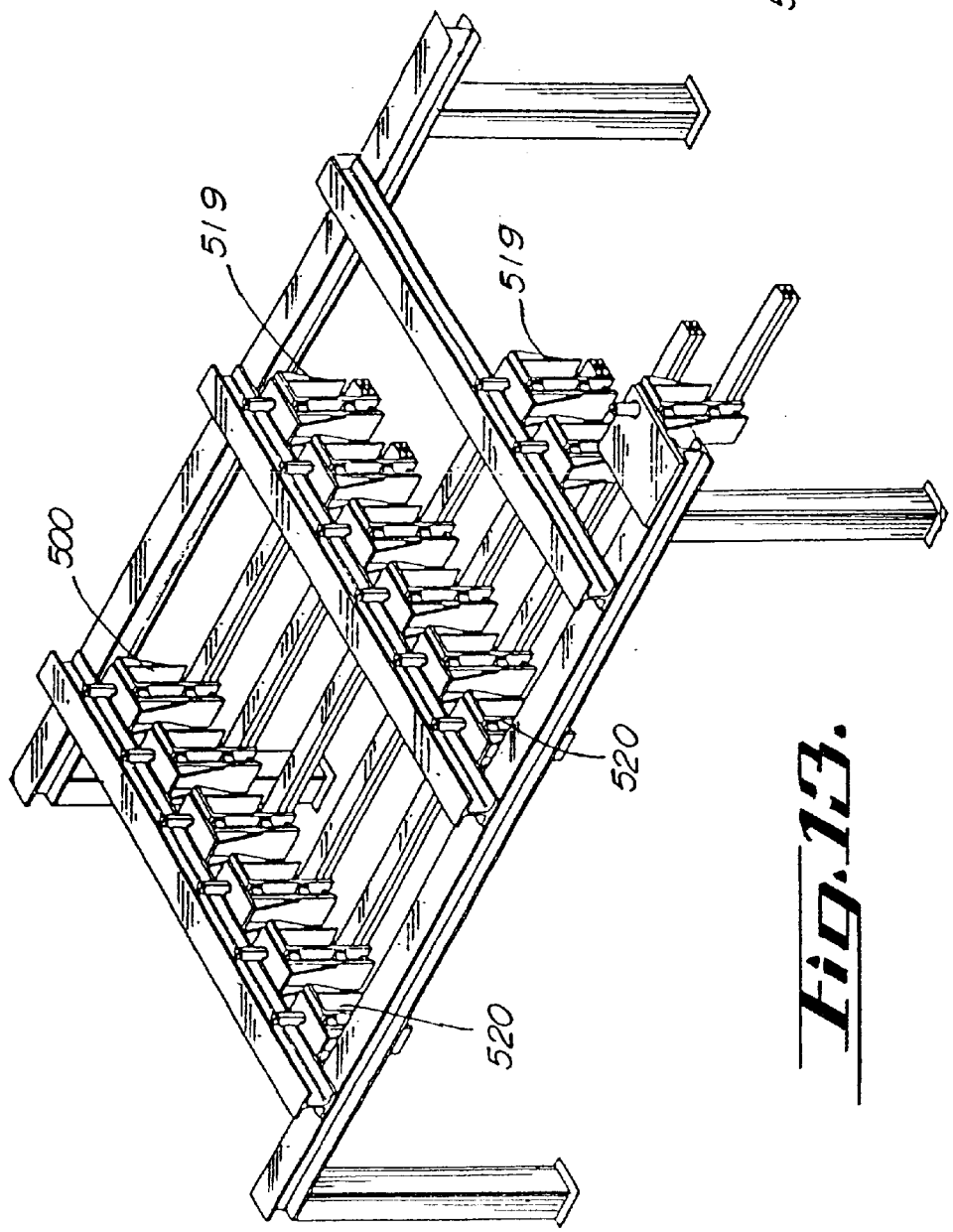
FIG. 13 is a perspective view of an alternative multiple magazine feeder.
Figure 16:
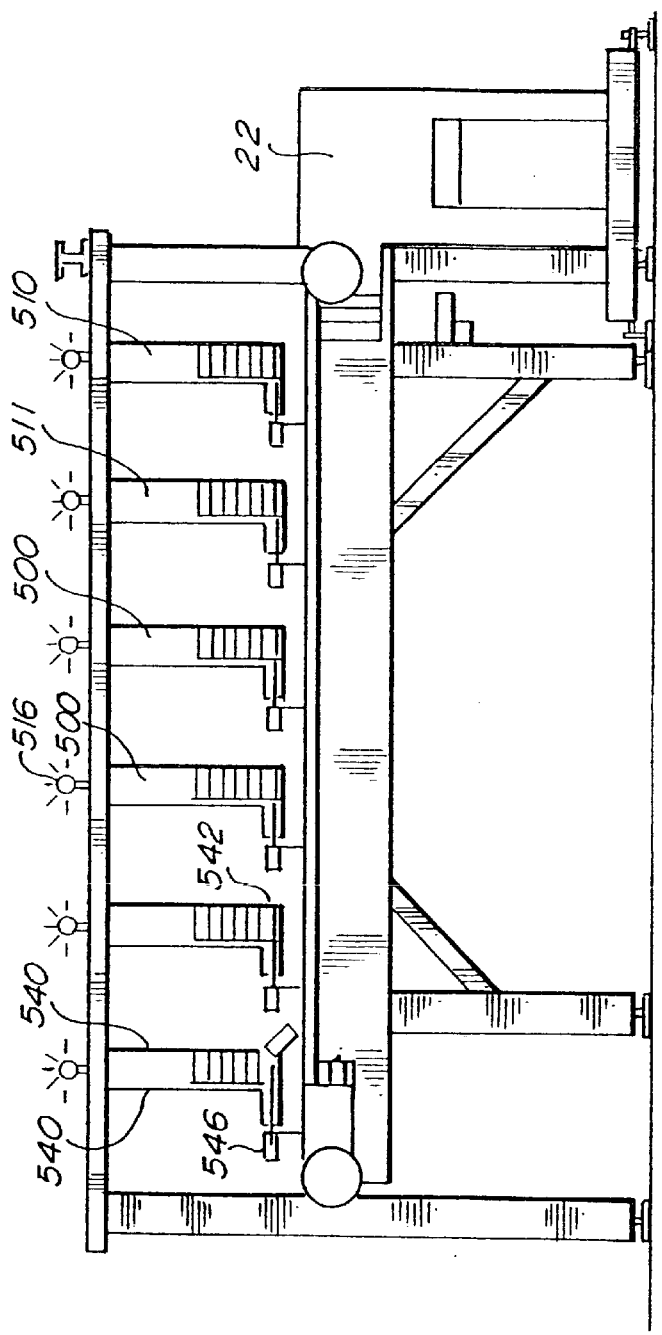
FIG. 16 is a side elevational view of a board processing system with an alternate multiple magazine feeder.

Referring to FIGS. 13, 14, 15 and 16 alternative embodiments for the multiple board magazines 500 which feed onto the board conveyor or live deck 28 for conveyance into the board extrusion portion 22. As illustrated in FIGS. 13 and 16 the different magazines will suitably be utilized for different sizes of lumber, for example different lengths of lumber as illustrated. Thus the control processor can control the sequence of boards released for a specific job. Moreover, these particular magazines can be utilized for recycling odd size lumber or previously cut or scrap lumber as illustrated in FIG. 16 in the first and second magazines 510, 511. Indicators such as light bulbs 516 can be provided to indicate when a particular magazine is below a particular level.

The magazines as illustrated in FIGS. 13, 14 and 15 each have a plurality of board racks 519 which utilize a plurality of individual vertical carriages 520 which slide upon a rail 522 and which are upwardly biased by springs 524. An actuator 528 operates to lower the vertical carriages or magazine 520 down where the lowermost board 532 is engaged by the horizontal board conveyor 28. Note in FIG. 14 a portion of the conveyor is broken away for clarity of illustration. A retention member 536 can be adjustable to allow the various magazines to accommodate different sizes of boards and, in particular, different thicknesses. As shown in FIG. 15 the retention member 536 will assure that the board adjacent to the lower most board 532 is not pulled out of the magazine when the lower most board is moved out laterally. The actuator 528 operates to lower the carriage and is controlled by the control processor.

FIG. 16 illustrates an alternative embodiment in which the magazines each comprise racks 519 with vertical supports 540 to form a magazine with a forward exit slot 541 to and have an injection plunger 546 to discharge the lower most board out of the stack of boards in the magazine. Typically there would be a plunger for each separate rack relative to each magazine.

The magazines designated for recycling are used in conjunction with the capabilities of preferred embodiments of the system which measure the length of the board. The control processor can be suitably configured to optimize and select particular sized boards to be cut from each measured board. Moreover, the angles of cuts on the ends of the lumber being recycled can be determined as described above.

In addition to the magazine board feeders an additional bunk feeder or other board feeding arrangement such as manually laying the boards on the transverse board conveyor may, of course, be utilized.

Figure 17:
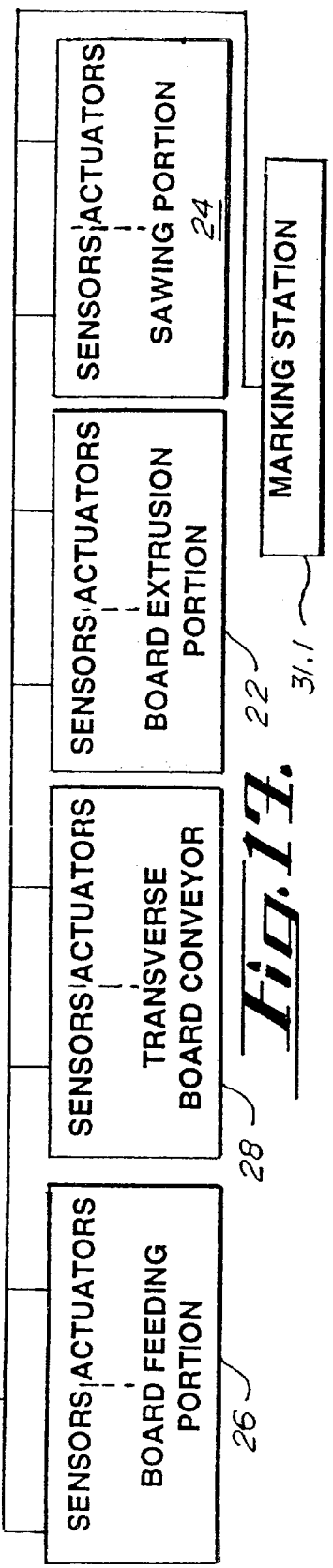
FIG. 17 is a block diagram showing the connections between the process controller and the major component of the system

Referring to FIG. 17 a block diagram showing the interconnection of the process controller to the various portions and components of the equipment embodying the invention. The process controller can be a single computer or several interconnected computers and as such can include a local area network. When used herein, "process controller" includes all of the above and also can include individual control cards for the specific portions of the equipment, i.e. the print head. Each of the separate portions will typically have sensors such as a proximity sensors, and actuators. When used herein, actuator includes fluid operated cylinders, either hydraulic or pneumatic, electric motors, including linear motors, solenoids and any other powered mechanism. Moreover, any of these sensors illustrated as being positioned on one of the portions could often be arranged on a different portion or component of the apparatus with similar performance and without being beyond the boundaries of the invention claimed herein. For example, the clamping rollers could be placed either on the board-extruding portion as portrayed or on the sawing portion.

Figure 18:
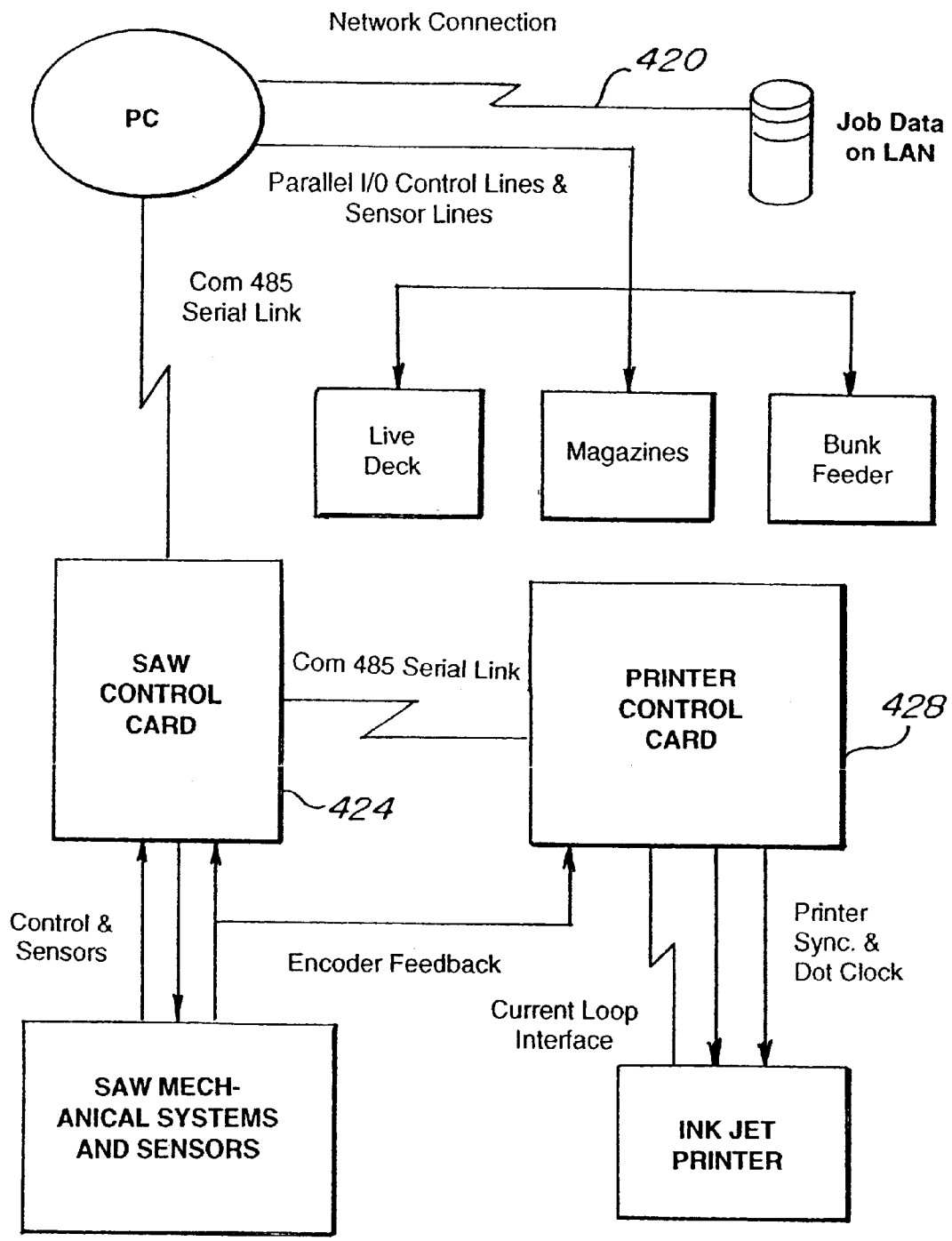
FIG. 18 is a block diagram showing an exemplary System Interconnection.

Referring to FIG. 18, a more detailed Systems Interconnection Block diagram is shown that is suitable for equipment embodying the invention. The data transfer process, programming of the process controller, and control of the various actuators is by conventional means familiar to those knowledgeable in such art.

Figure 19:
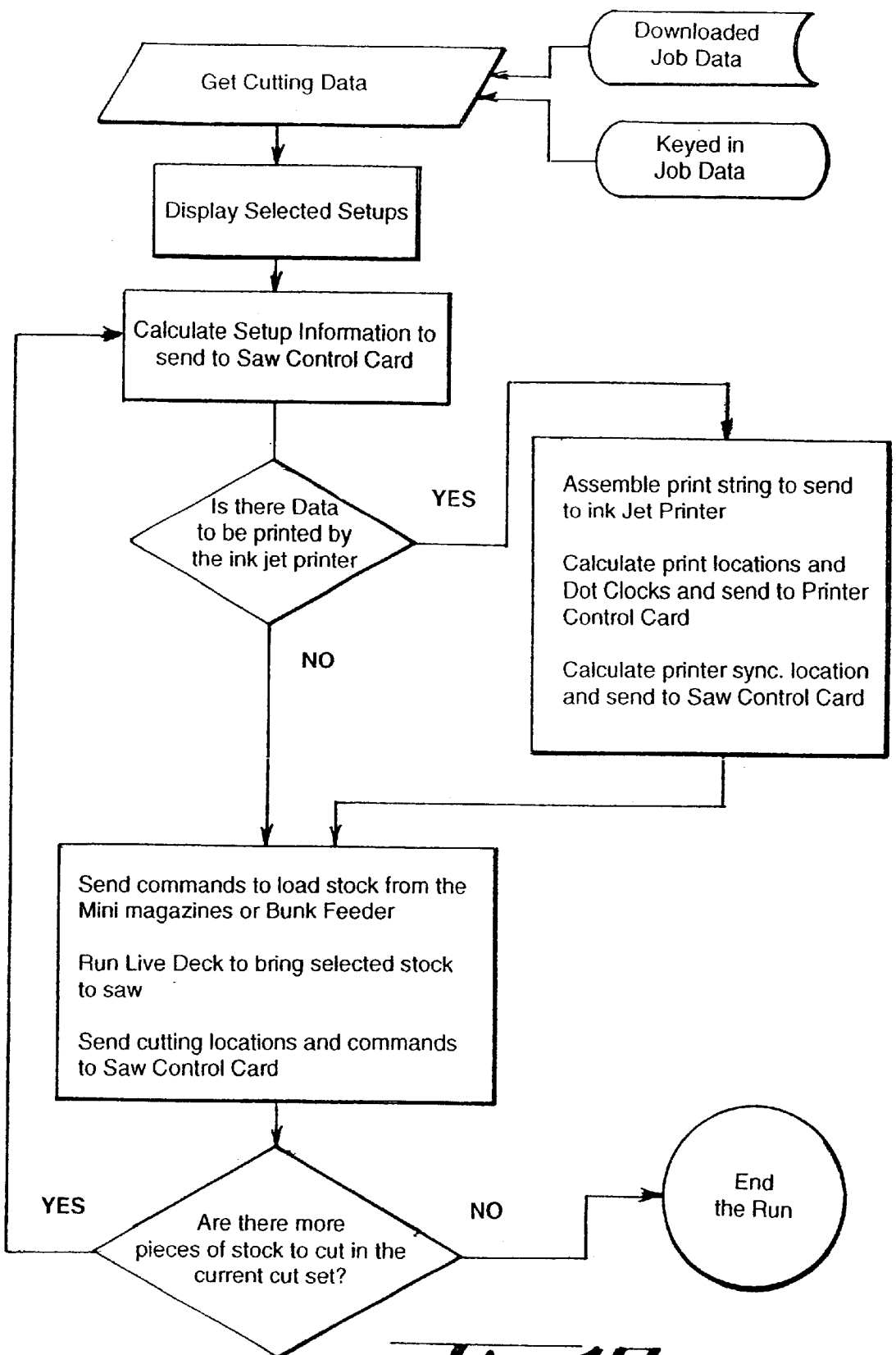
FIG. 19 is an exemplary Program Flow Chart for the system.

Referring to FIG. 19, a suitable flow chart for the process controller is illustrated.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A method for automated sawing and marking each board of a series of boards, the method comprising the steps of:
   a) placing a series of boards on a conveyor;
   b) automatically controlling by a computerized process controller: a lengthwise conveyance of boards on the conveyor, a marking station, and a sawing station;
   c) gripping each individual board to convey said board lengthwise;
   d) calculating with the computerized process controller stud location positions on each board;
   e) calculating with the computerized process controller locations on the board to be sawed;
   f) advancing each board toward the sawing station;
   g) printing two dimensional stud location indicia on the boards at the stud location positions by a printing mechanism at the marking station without contacting each board with the printing mechanism;
   h) performing step g without stopping the advancing of each board; and
   i) performing a sawing operation with a chop saw at the sawing station on each board at the locations to be sawed.

2. A method for sawing and marking boards according to claim 1 further comprising the step of utilizing a laser to score the surface of the board to accomplish the printing step.

3. A method for sawing and marking boards according to claim 1 wherein the printing step further comprises the step of intermittently discharging ink from a plurality of aligned ink jets as the board is passing said ink jets to create a two dimensional image on the board.

4. A method for sawing and marking boards according to claim 1 further comprising the step of individually depositing boards on the conveyor from a plurality of magazines to provide the series of boards.

* * * * *